April 4, 1950  R. C. CERF, JR  2,503,192

LOCKING CAM FOR SPRING LATCH BOLTS

Filed June 11, 1946

*INVENTOR.*
ROBERT C. CERF Jr.
BY
ATTORNEY

Patented Apr. 4, 1950

2,503,192

UNITED STATES PATENT OFFICE 2,503,192

LOCKING CAM FOR SPRING LATCH BOLTS

Robert C. Cerf, Jr., Los Angeles, Calif., assignor to Hollymade Hardware Manufacturing Company, Los Angeles, Calif., a corporation of California Application June 11, 1946, Serial No. 675,952

1 Claim. (Cl. 292—153)

This invention relates to locking means for a spring latch bolt.

One object of the invention is to provide means for locking a spring latch bolt. Another object is to provide a means to lock a bolt by blocking the end thereof. Still another object is to provide partly concealed emergency unlocking means.

These and other objects are attained by my invention which will be understood from the following description, reference being made to the accompanying drawing in which.

Figure 1:
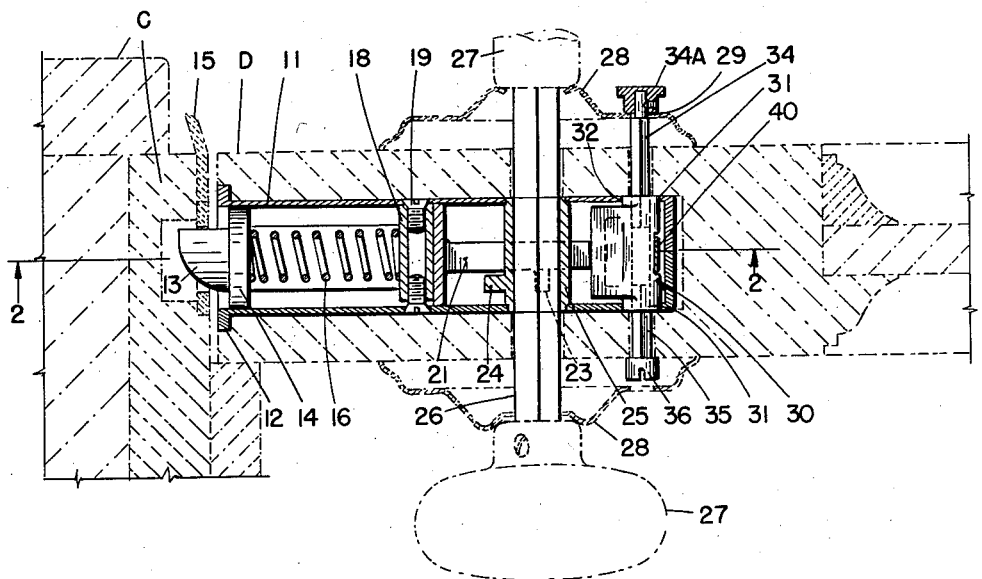
Fig. 1 is a top plan view partly in section showing a preferred form of my invention.
Figure 2:
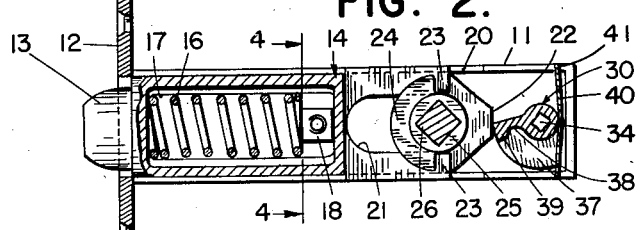
Fig. 2 is a cross-sectional view taken on the line 2—2 of Fig. 1.
Figure 4:
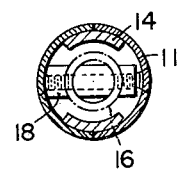
Fig. 4 is a cross-sectional view taken on the line 4—4 of Fig. 2.

My improved locking latch bolt consists generally of a tubular spring latch device having cam locking means adapted to be rotated into position between the inner end of the tubular housing and the inner end of the bolt, to prevent the bolt from being moved by the turning of the door knob spindle.

Referring to the drawings, the tubular casing 11 is provided with an edge plate 12 for attachment to a door D, the casing being enclosed in a drilled horizontal hole, and the external portion 13 of the bolt 14 being engaged in a striker 15 attached to the door casing C. The bolt 14 is held in normally extended position by the coil spring 16 which is held in a spring slot 17 in the bolt, the spring abutting the end of the spring slot 17 and the post 18 fastened to the wall of the casing 11. The post 18 may conveniently serve for joining two segments of the casing, split longitudinally, screws 19 holding the parts together.

The casing 11 is provided with diametrically opposite longitudinal openings 20 in its intermediate portion adjacent the spindle slot 21 in the bolt, these openings 20 serving to keep the bolt in alignment. The bolt adjacent the spindle slot 21 is flat and centrally disposed across the tubular casing, and is tapered down to a narrowed abutment end 22. Upstanding ears 23 are provided on the flat portion of the bolt 14 adapted to be engaged by the bolt retracting cam 24 which is affixed to the spindle sleeve 25 having a square hole adapted to receive a square spindle 26, to the ends of which are attached the two knobs 27, rosettes 28 being provided between the knob shank and the door D. Each rosette 28 is provided with a hole 29 disposed to one side of the hole for the spindle 26.

A segmental cam 30 with end hubs 31 is mounted for turning in bearing holes 32 provided in the inner end portion of the casing 11. The end hubs 31 are provided with rectangular axial holes 33 adapted to receive short connecting bars 34 and 35. The bar 34 extends through the hole 29 in the rosette 28, and its end is provided with a knob or thumb nut 34A for turning the cam 30. A shorter bar 35 extends from the opposite hub 31 of the segmental cam 30, and its end is provided with a head 36 slotted to be engaged by a screw driver put through the hole 29 in the rosette 28.

The cam 30 may be turned normally from one side of the door by the tumb nut 34A to lock the bolt 14 and it may be unlocked (or locked) in an emergency, by means of a screw driver put through the hole 29 in the rosette 28 on the opposite side of the door.

Figure 3:
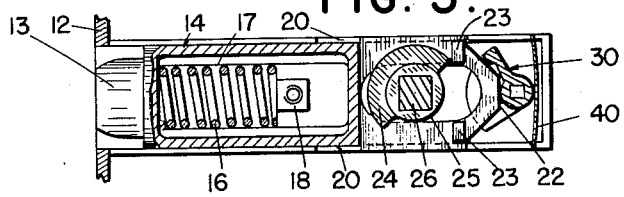
Fig. 3 is a cross-sectional view similar to Fig. 2 but with the bolt retracted.
Figure 5:
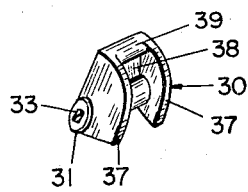
Fig. 5 is a perspective view showing the locking cam.

The cam 30 has segmental end plates 37 which are connected by a wall 38 extending radially from the hubs 31 to the outer periphery, where a thickened wall 39 provides an abutting surface to abut the inner end 22 of the bolt 14. Between the segmental end plates 37 and the wall 39 the cam is open or hollow to permit the endwise movement of the bolt end in the hollow when the bolt is retracted, as shown in Fig. 3. A flat spring 40 mounted in narrow slots 41 in the casing is provided against the hubs to provide friction against the turning of the cam. When the cam 30 is turned so that the thickened wall 39 abuts the inner end 22 of the bolt 14, the bolt is securely held extended in the striker hole in the door casing C. The cam 30 is arranged so that in full abutting position the cam has been moved over or beyond dead center so that it will not slip back to unlock the bolt. When the cam 30 is turned to release the bolt 14 for inward movement, by means of turning of the knob 27, the end of the bolt slides into the hollow portion of the cam. The bolt may not be locked in the retracted position, because the bolt end 22 prevents the turning of the cam 30.

While I have shown one form of a spring bolt operating mechanism, it will be understood that other means of retracting the bolt by turning the door knob may be used in combination with my locking cam device.

I claim:

A lockable bolt latch comprising a tubular casing having a closed inner end; a bolt slidable in said casing; means to retract said bolt upon the turning of a door-knob spindle; and locking means operable by a knob member on one side of a door turning on an auxiliary axis, said locking means consisting of a cam rotatable into position to abut the end of said bolt to prevent retraction thereof, said cam being formed by segmental end plates connected by a radial wall extending from the hub to the outer periphery of said cam, said plates and wall enclosing the inner end of said bolt when said bolt is retracted, and the outer edge of said radial wall abutting the inner end of said bolt when said cam is rotated to locking position.

ROBERT C. CERF, Jr.

REFERENCES CITED

The following references are of record in the file of this patent:

UNITED STATES PATENTS

| Number | Name | Date |
|---|---|---|
| 282,886 | Hamilton | Aug. 7, 1883 |
| 660,061 | Macnamara | Oct. 16, 1900 |
| 697,599 | Barrett | Apr. 15, 1902 |
| 1,641,537 | Halpern | Sept. 6, 1927 |
| 2,055,688 | Halinka | Sept. 29, 1936 |
| 2,400,403 | Falk | May 14, 1946 |